(12) United States Patent
Hollström et al.

(10) Patent No.: US 6,952,497 B1
(45) Date of Patent: Oct. 4, 2005

(54) METHOD AND SYSTEM FOR ELECTRONICALLY RECORDING TRANSACTIONS AND PERFORMING SECURITY FUNCTION

(75) Inventors: Magnus Hollström, Lund (SE); Nils Rydbeck, Cary, NC (US); Magnus Tillgren, Malmö (SE); Patrik Olsson, Malmö (SE); Örjan Johansson, Veberöd (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 926 days.

(21) Appl. No.: 09/703,492

(22) Filed: Oct. 31, 2000

Related U.S. Application Data

(60) Provisional application No. 60/192,662, filed on Mar. 28, 2000, provisional application No. 60/190,343, filed on Mar. 16, 2000, provisional application No. 60/182,742, filed on Feb. 16, 2000.

(51) Int. Cl.[7] ................. G06K 9/00; G06K 17/60
(52) U.S. Cl. ................. 382/188; 382/119; 705/72
(58) Field of Search ................. 382/115, 119, 187, 382/305, 312, 201, 188, 189; 235/435, 487, 235/488; 178/19.04, 19.05; 725/112, 114; 705/72

(56) References Cited

U.S. PATENT DOCUMENTS

| | | | |
|---|---|---|---|
| 4,322,162 A | 3/1982 | McKelvie et al. | 356/35.5 |
| 4,445,028 A | 4/1984 | Huber | 235/472 |
| 4,534,519 A | 8/1985 | Euteneuer et al. | |
| 4,751,380 A | 6/1988 | Victor et al. | |
| 4,797,544 A | 1/1989 | Montgomery et al. | 250/221 |
| 4,856,077 A | 8/1989 | Rothfjell | |
| 5,247,137 A * | 9/1993 | Epperson | 178/19.04 |
| 5,331,547 A | 7/1994 | Laszlo | |
| 5,333,209 A * | 7/1994 | Sinden et al. | 382/187 |
| 5,349,139 A * | 9/1994 | Verrier et al. | 178/19.04 |
| 5,389,945 A | 2/1995 | Sheridon | |
| 5,416,312 A | 5/1995 | Lamoure | 235/494 |
| 5,422,959 A * | 6/1995 | Lee | 382/119 |
| 5,441,309 A * | 8/1995 | D'Alessio et al. | 283/58 |
| 5,442,147 A | 8/1995 | Burns et al. | 178/18 |
| 5,453,761 A | 9/1995 | Tanaka | |
| 5,457,728 A | 10/1995 | Whiting et al. | |
| 5,463,605 A | 10/1995 | Nishida et al. | |
| 5,477,012 A | 12/1995 | Sekendur | 178/18 |
| 5,509,692 A * | 4/1996 | Oz | 283/70 |
| 5,561,282 A | 10/1996 | Price et al. | |

(Continued)

FOREIGN PATENT DOCUMENTS

DE 3427 067 2/1985

(Continued)

Primary Examiner—Kanjibhai Patel
(74) Attorney, Agent, or Firm—Jenkens & Gilchrist, P.C.

(57) ABSTRACT

A method and system for electronically recording and authorizing a transaction utilizes an electronic reading device for generating an electronic reproduction of written information by detecting positions of the electronic reading device relative to a particular address pattern in a data entry field of a formatted surface. The electronic reproduction of the written information is sent to a server that stores or processes the electronic reproduction. For example, the server can determine whether the electronic reading device is authorized to use the particular address pattern or whether the electronic reproduction correlates with stored data. In addition, to enable the electronic reading device, detection of a correct user personal identification number (PIN) or user fingerprint may be required.

32 Claims, 8 Drawing Sheets

U.S. PATENT DOCUMENTS

| | | |
|---|---|---|
| 5,581,257 A | 12/1996 | Greene et al. |
| 5,596,652 A | 1/1997 | Piatek et al. |
| 5,612,736 A | 3/1997 | Vogeley et al. |
| 5,619,431 A | 4/1997 | Oda |
| 5,623,345 A | 4/1997 | Merchant et al. |
| 5,640,193 A | 6/1997 | Wellner |
| 5,644,628 A | 7/1997 | Schwarzer et al. |
| 5,652,412 A | 7/1997 | Lazzouni et al. ............. 178/18 |
| 5,657,396 A | 8/1997 | Rudolph et al. |
| 5,661,506 A | 8/1997 | Lazzouni et al. ........... 345/179 |
| 5,686,705 A | 11/1997 | Conroy et al. |
| 5,710,832 A | 1/1998 | Berman et al. |
| 5,739,810 A | 4/1998 | Merkel |
| 5,767,496 A | 6/1998 | Swartz et al. |
| 5,793,301 A | 8/1998 | Patterson, Jr. et al. |
| 5,804,803 A * | 9/1998 | Cragun et al. .............. 235/375 |
| 5,831,601 A | 11/1998 | Vogeley et al. |
| 5,838,798 A | 11/1998 | Stevens, III |
| 5,844,561 A | 12/1998 | Tanimoto et al. |
| 5,848,373 A | 12/1998 | DeLorme et al. |
| 5,850,077 A | 12/1998 | Tognazzini |
| 5,852,434 A | 12/1998 | Sekendur |
| 5,852,793 A | 12/1998 | Board et al. |
| 5,892,824 A | 4/1999 | Beatson et al. |
| 5,903,667 A | 5/1999 | Kuzunuki et al. |
| 5,905,248 A | 5/1999 | Russell et al. .............. 235/462 |
| 5,927,872 A | 7/1999 | Yamada |
| 5,990,875 A | 11/1999 | Bi et al. |
| 6,054,990 A | 4/2000 | Tran |
| 6,109,526 A | 8/2000 | Ohanian et al. |
| 6,118,436 A | 9/2000 | Kushita |
| 6,119,944 A | 9/2000 | Mulla et al. |
| 6,144,324 A | 11/2000 | Sasaki |
| 6,182,901 B1 | 2/2001 | Hecht et al. |
| 6,188,392 B1 | 2/2001 | O'Connor et al. |
| 6,188,404 B1 | 2/2001 | Rekimoto |
| 6,208,771 B1 | 3/2001 | Jared et al. |
| 6,218,964 B1 | 4/2001 | Ellis |
| 6,236,486 B1 | 5/2001 | Nocker, IV |
| 6,266,295 B1 | 7/2001 | Parker et al. |
| 6,270,011 B1 | 8/2001 | Gottfried |
| 6,275,611 B1 * | 8/2001 | Parthasarathy .............. 382/187 |
| 6,307,955 B1 | 10/2001 | Zank et al. |
| 6,311,042 B1 | 10/2001 | DeSchrijver |
| 6,321,158 B1 | 11/2001 | DeLorme et al. |
| 6,326,957 B1 | 12/2001 | Nathan et al. |
| 6,330,976 B1 * | 12/2001 | Dymetman et al. ......... 235/487 |
| 6,348,914 B1 | 2/2002 | Tuli |
| 6,377,249 B1 | 4/2002 | Mumford |
| 6,396,481 B1 | 5/2002 | Challa et al. |
| 6,446,871 B1 | 9/2002 | Buckley et al. |
| 6,448,959 B1 | 9/2002 | Kawaguchi et al. |
| 6,456,749 B1 | 9/2002 | Kasabach et al. |
| 6,462,941 B1 | 10/2002 | Hulick et al. |
| 6,476,825 B1 | 11/2002 | Croy et al. |
| 6,501,463 B1 | 12/2002 | Dahley et al. |
| 6,548,768 B1 | 4/2003 | Pettersson et al. |
| 6,577,299 B1 | 6/2003 | Schiller et al. |
| 6,587,221 B1 | 7/2003 | Young |
| 6,593,908 B1 | 7/2003 | Borgström et al. |
| 6,611,259 B1 | 8/2003 | Tillgren et al. |
| 6,622,031 B1 | 9/2003 | McCleary et al. |
| 6,693,623 B1 | 2/2004 | Tillgren et al. |
| 6,698,660 B2 | 3/2004 | Fåhraeus et al. |

FOREIGN PATENT DOCUMENTS

| | | |
|---|---|---|
| DE | 42 12 990 | 10/1993 |
| EP | 0 407 734 | 1/1991 |
| EP | 0 615 209 A | 9/1994 |
| EP | 0 717 367 | 6/1996 |
| EP | 0 857 680 | 8/1998 |
| GB | 2 057 801 | 4/1981 |
| GB | 2 307 553 | 5/1997 |
| GB | 2306669 | 5/1997 |
| JP | 08202261 | 8/1996 |
| WO | WO 94/10652 | 5/1994 |
| WO | WO 98/35336 | 8/1998 |
| WO | WO 99/35601 | 7/1999 |
| WO | WO 99/39277 | 8/1999 |
| WO | WO 99/60468 | 11/1999 |
| WO | WO 99/66441 | 12/1999 |
| WO | WO 00/00928 | 1/2000 |
| WO | WO 00/70551 | 11/2000 |
| WO | WO 01/48654 | 7/2001 |

* cited by examiner

METHOD AND SYSTEM FOR ELECTRONICALLY RECORDING TRANSACTIONS AND PERFORMING SECURITY FUNCTION

REFERENCE TO EARLIER FILED PROVISIONAL APPLICATIONS

This patent application claims the benefit of priority from, and incorporates by reference the entire disclosure of, co-pending U.S. Provisional Patent Application Ser. Nos. 60/182,742, filed on Feb. 16, 2000, 60/190,343, filed on Mar. 16, 2000, and 60/192,662, filed on Mar. 28, 2000.

CROSS REFERENCE TO RELATED APPLICATION

The present application for patent is related to and hereby incorporates by reference the subject matter disclosed in U.S. patent application Ser. No. 09/703,497, entitled "Specially Formatted Paper Based Applications of a Mobile Phone"; Ser. No. 09/703,503, entitled "Method and System for Using an Electronic Reading Device as a General Application Input and Navigation Interface"; Ser. No. 09/703,704, entitled "Predefined Electronic Pen Applications in Specially Formatted Paper"; Ser. No. 09/703,506, entitled "A System and Method for Operating an Electronic Reading Device User Interface"; Ser. No. 09/703/325, entitled "Method and System for Using an Electronic Reading Device on Non-paper Devices"; Ser. No. 09/703,486, entitled "Multi-layer Reading Device"; Ser. No. 09/703,351, entitled, "Method and System for Configuring and Unlocking an Electronic Reading Device"; Ser. No. 09/703,485, entitled "Printer Pen"; Ser. No. 09/703,494, entitled "Electronic Pen with Ink On/ink off Function and Paper Touch Sensing"; Ser. No. 09/703,480, entitled "Method and System for Handling FIFO and Position Data in Connection with an Electronic Reading Device"; Ser. No. 09/703,479, entitled "Hyperlink Applications for an Electronic Reading Device"; Ser. No. 09/703,464, entitled "Measuring Applications for an Electronic Reading Device"; Ser. No. 09/703, 321, entitled "Method and System for Controlling an Electronic Utility Device Using an Electronic Reading Device"; and Ser. No. 09/703,481, entitled "Positioning Applications for an Electronic Reading Device"; and Ser. No. 09/703,326, entitled "Method for Sharing Information Between Electronic Reading Devices"; and in U.S. Provisional Patent Application Ser. Nos. 60/244,775, entitled "Electronic Pen for E-Commerce Implementations"; and 60/244,803, entitled "Electronic Pen Help Feedback and Information Retrieval"; all filed concurrently herewith.

BACKGROUND OF THE INVENTION

1. Technical Field of the Invention

The present invention relates in general to the communications field, and in particular to an interaction of an electronic reading device with an address pattern.

2. Description of Related Art

Numerous devices exist for accepting user input and controlling user interaction with desktop and portable computers, personal digital assistance (PDAs), mobile phones, and other types of electronic devices. For example, a keyboard can be used to accept typed input and other types of commands, a mouse or a track-ball can be used to provide relative motion input as well as various types of point-and-click selections, a keypad can be used to provide input of numerical data and functional commands, navigational keys can be used for scrolling lists or otherwise repositioning a cursor, and various types of touchpads or touchscreens can be used to provide absolute positional coordinate inputs. Each type of mechanism for accepting input and for supporting user interaction has benefits and disadvantages in terms of size, convenience, flexibility, responsiveness, and easy of use. Generally, the selection of a particular type of input mechanism is dependent upon the function of the application and the degree and type of interaction required.

With the ever expanding capabilities and availability of applications both on the Internet and the area of wireless technology, there continues to be a need to develop and provide new mechanisms for accepting input and interacting with users. In particular, some of the existing technologies suffer from drawbacks or limitations, such as size and flexibility, that make them impractical and/or inconvenient to use in some situations. By expanding the range of mechanisms for supporting user interaction, application developers and end-users can have greater flexibility in the selection of input devices. Preferably, any such new mechanisms will provide increased flexibility and will maximize user convenience. In addition, the development of new mechanisms for interacting with users can expand the realm of potential applications.

For example, while a keyboard typically provides a great deal of flexibility, particularly when it is used in connection with a mouse, a touchscreen, or other navigational device, its size makes it inconvenient in many cases, especially in the wireless context.

SUMMARY OF THE INVENTION

The present invention comprises a method and system for electronically recording information written with an electronic reading device and for authorizing use of the electronic reading device in connection with the electronic recordation. In accordance with the invention, information is written in a data field of a formatted surface that includes an address pattern. The information is written using an electronic reading device that detects positions on the address pattern. The detected positions are used to generate an electronic reproduction of the written information, which is sent to a server.

In one embodiment of the invention, the formatted surface can comprise a negotiable instrument that has a unique address pattern associated with a specific user. By restricting use of the negotiable instrument to the particular electronic reading device, unauthorized use of the electronic reading device and/or the negotiable instrument can be prevented. In addition, to further improve security, the server can compare an electronic reproduction of a signature with stored signature characteristics to determine whether the use is authorized.

In another embodiment of the invention, use of the electronic reading device on the negotiable instrument or on other formatted surfaces can require that the electronic reading device first be initialized with a correct personal identification number (PIN) or by detecting a unique physical aspect of the user, such as a fingerprint or corneal scan. To facilitate entry of a PIN code or other initialization process, the electronic reading device communicates with the user using different vibration schemes. In particular, a first vibration scheme can be used to request initialization, while a second vibration scheme is used to indicate a successful initialization. Preferably, the electronic reading device does not leave marks during the initialization process so that there is not a written record of the PIN code. In addition, the electronic reading device preferably remains unlocked for a preselected period.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

The present invention relates to a system in which an electronic reading device, such as an electronic pen, an electronic mouse, or a hand scanner, works in cooperation with an address pattern (e.g., a specially formatted paper) to provide for a detection of a location of the electronic reading device over the address pattern. For instance, a pattern of dots can be defined such that, by examining a very small portion of the pattern, a precise location in the overall pattern can be determined. In fact, it is possible to define a pattern that has the size of 73,000,000,000,000 A4 pages, which is equivalent to half the size of the entire United States. Portions of the pattern can be placed on sheets of paper or other objects.

Then, using an electronic scanner pen that can detect the dots in the pattern, it is possible to detect the location of the pen with respect to the unique pattern. For example, when such a pen is used in connection with a specially formatted paper, the pen can detect its position (e.g., using a built in camera) by detecting a 3 mm by 3 mm portion of the pattern. By taking approximately 100 pictures per second, the pen is capable of determining its exact position to within 0.1 mm or less. This system can be used to provide user input, to facilitate user interaction, or to store handwritten notes or drawings. Moreover, by associating portions of the overall pattern with certain applications, such a system can be used to interact with wide variety of applications.

Figure 1:
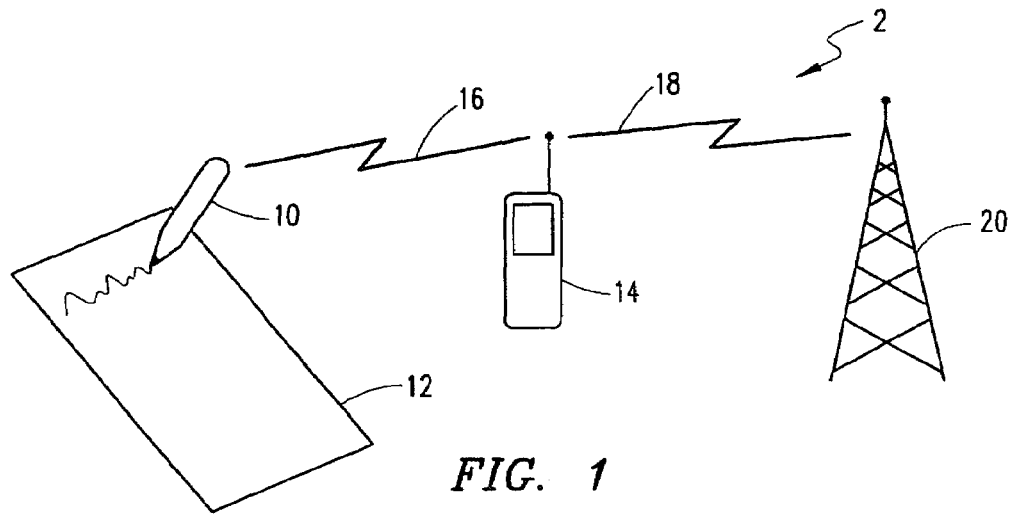
FIG. 1 is a block diagram of a system in which an electronic pen can be used as an input device.

Referring now to FIG. 1, there is illustrated an example of a system 2 in which an electronic pen 10 can be used as an input device. The electronic pen 10 includes an ink cartridge and is capable of writing in a typical fashion. The electronic pen 10, however, includes some type of sensor (e.g., a built-in camera) that is used for detecting an address pattern on a specially formatted piece of paper 12. In particular, the paper 12 is formatted with a small portion of a large address pattern such that when the electronic pen 10 is used to write on or otherwise make marks on the paper 12, the writings or markings can be electronically detected and stored.

As an example, the paper 12 might constitute a form that can be used for sending an email. Thus, the paper 12 might include a space for writing in the email address of an intended recipient, a space for writing a subject of the email, and a space for writing the body of the email. As the electronic pen 10 is used to fill in each of the spaces, the position and movement of the electronic pen 10 on the paper 12 can be determined by repeatedly detecting the current x, y coordinates of the pen 10 (e.g., at rate of 100 frames per second). The markings can then be converted into ASCII text using an appropriate handwriting recognition program. Once the user completes the form, the email can be sent, for example, by checking a send box at a predetermined location on the paper 12.

Preferably, the coordinate information collected by the pen 10 is sent by a short range radio transmitter in the electronic pen 10 to a nearby mobile station 14 using a short range radio interface 16 such as a local wireless radio link (e.g., a local wireless radio link supported by Ericsson's Bluetooth™ wireless communications technology). Alternatively, instead of using a mobile station 14, the coordinate information could also be sent to, for instance, a desktop or portable computer, a personal digital assistant (PDA), a television, or a Bluetooth terminal. Moreover, instead of using a local wireless radio link, other types of local wireless links, such as inductive coupling and infrared light; other types of radio links, such as Global System for Mobile Communication (GSM); or wired transmission media, such as a cable can also be used. The information can then be forwarded via an appropriate link, such as a cellular air interface 18, to a base station 20 or other network node.

Figure 2:
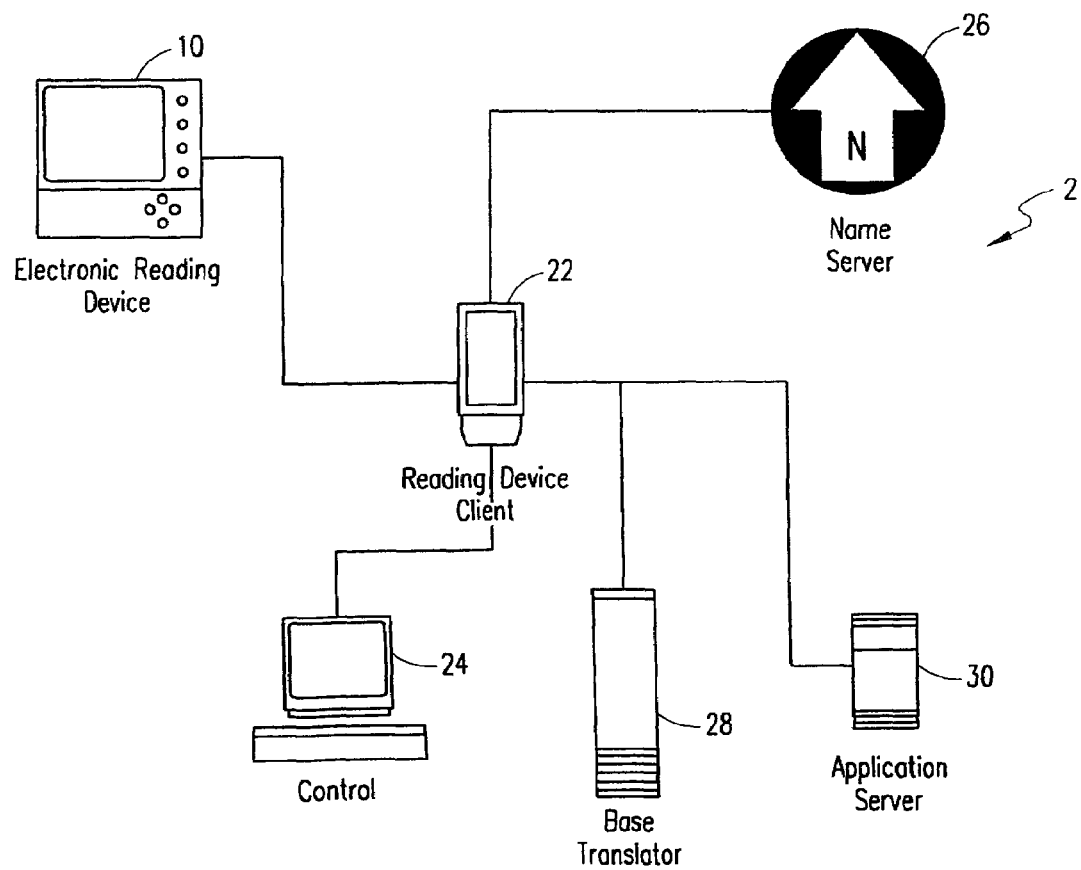
FIG. 2 is a schematic diagram of a system for supporting use of the electronic pen described in connection with FIG. 1.

Referring now to FIG. 2, there is illustrated a schematic diagram of a system 2 for supporting use of the electronic pen 10 described in connection with FIG. 1. Throughout the subsequent discussion, the system 2 is described primarily in connection with an electronic pen 10. It will be understood, however, that the invention and the underlying system 2 can instead use any type of electronic reading device, such as an electronic pen, an electronic mouse, or a hand scanner. As shown in FIG. 2, the system 2 includes six different entities, including the electronic pen 10, electronic pen client 22, a control node 24, a name server 26, a base translator 28, and an application server 30. Although these various devices are described and depicted separately, it is also possible to combine two or more of the entities into the same device (e.g., the electronic pen 10 and electronic pen client 22 can be contained in the same device).

The electronic pen 10 is responsible for detecting positions on the address pattern, producing actions, and sending information to the electronic pen client 22. In addition to being able to leave pen markings, some electronic pens can also have the ability to produce other types of output, such as sound, vibration, or flashing lights. The electronic pen 10 includes a memory for storing a current grid, which comprises information relating to an area of the address pattern that is near the most recently detected position of the electronic pen 10. When the electronic pen 10 is loaded with the current grid, it knows what actions to take based on the positions that are read from the address pattern. When the electronic pen 10 is first turned on or when it moves to an area outside of the current grid, the electronic pen 10 must first request a new grid description before it can continue processing information. In such a situation, the electronic pen 10 requests a new grid description from the electronic pen client 22.

The electronic pen client 22 can be located in a mobile station 14, in a PDA, in a desktop or portable computer, in the electronic pen 10 itself, in a server somewhere on the Internet, or in another device. The electronic pen client 22 serves as the center of communications in the overall system 2. In particular, the electronic pen client 22 receives new grid requests and action requests from the electronic pen 10 and responds to these requests by contacting an appropriate entity within the overall system 2 to properly respond to the request from the electronic pen 10. Furthermore, when the electronic pen 10 is being used in connection with a particular application, the electronic pen client 22 can store the application and/or any corresponding data received from the electronic pen 10 to facilitate processing and use of the application.

The name server 26 is used for translating a detected position on the address pattern into a Uniform Resource Location (URL) associated with that position. Different portions of the address pattern are assigned to different applications. Neither the electronic pen 10 nor the electronic pen client 22, however, is aware of all of the different applications and the particular areas assigned to each application. Thus, when the electronic pen 10 detects a new or unknown position, it forwards the position information to the electronic pen client 22, which in turn sends the information to the name server 26. The name server 26 then identifies an application associated with the received position and retrieves a URL where a description of the particular application can be found. The retrieved URL can then be used by the electronic pen client 22 to retrieve the application description.

As an alternative, the name server 26 can comprise a global name server that keeps track of a location, in the form of URLs to local name servers, where more information can be found about different addresses in the pattern. Similarly, each local name server can use other local name servers to obtain the necessary information, i.e., to convert a position into a URL where an application description can be found. At the lowest level, the local electronic pen client should know all the paper addresses that are within a specific application or applications.

There are some services that should be available in the overall system 2 for which it is inconvenient or not feasible to support such services in the electronic pen 10 or the electronic pen client 22. In such a case, the base translator 28 can be used to support the services. For example, the base translator 28 might contain handwriting recognition software for converting pen actions into text or for converting pen actions into a predefined set of symbols. When such services are needed, the electronic pen client 22 can send a request to the base translator 28 along with the necessary data, and the base translator 28 can perform the requested service.

Another entity in the system 2 is a control node 24. The control node 24 is used for responding to actions in a standardized way. For example, the control node 24 can be used to respond to certain generic functions, such as "cancel" or "submit" functions, in a consistent manner without regard to the particular application that is currently active.

In addition, the control node 24 is used for creating streaming-like applications. For instance, some applications might require that the positions on the address pattern that are detected by the electronic pen 10 be immediately sent, upon detection, to the electronic pen client 22 for use by the application (i.e., the electronic pen 10 does not wait to transmit the position data until a complete stroke is detected or until a "send" field is touched). One example is an application that is used to control an industrial robot in a warehouse. In such a case, the application description that is loaded onto the electronic pen server 22 can include instructions that all positions be streamed to a control node 24. As a result, the control node 24 can receive the positions in real time and can control the robot without waiting for the form (i.e., the current grid) to be completed. Thus, the control node 24 can perform a real-time translation from detected positions to a responsive action, such as moving an object (e.g., a robot, a valve, etc.) or controlling a process.

The application server 30 is a regular web or wireless application protocol (WAP) server that supports an application associated with a particular area of the address pattern. The application server 30 stores an application description and provides the application description to the electronic pen client 22 upon request. In addition, the application server 30 receives input data from the electronic pen 10 via the electronic pen client 22. For example, the application description might define a number of data entry areas on a form. Thus when data is entered on the form by the electronic pen 10, the data is received by the electronic pen client 22, converted into text using handwriting recognition software, and forwarded to the application server 30, which stores the data or otherwise processes the data in accordance with the function of the application.

Figure 3:
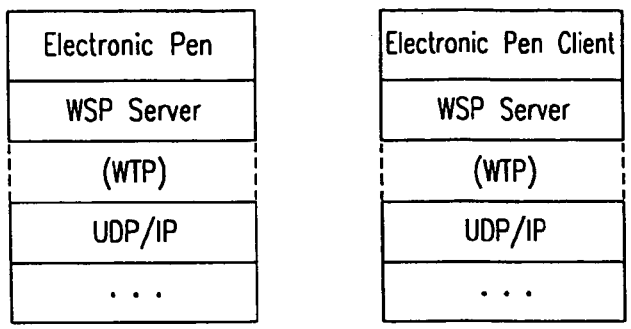
FIG. 3 is an illustration of the protocol stacks that can be used in the case of local communications between an electronic pen and an electronic pen client.
Figure 4:
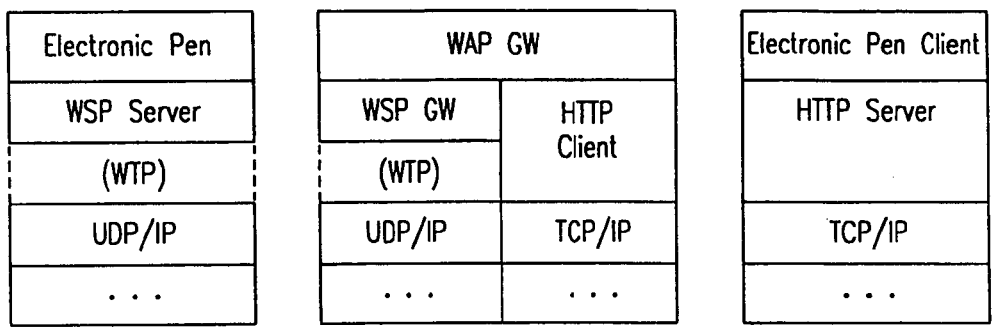
FIG. 4 is an illustration of protocol stacks that can be used when an electronic pen and an electronic pen client communicate with one another via an Internet connection.
Figure 5:
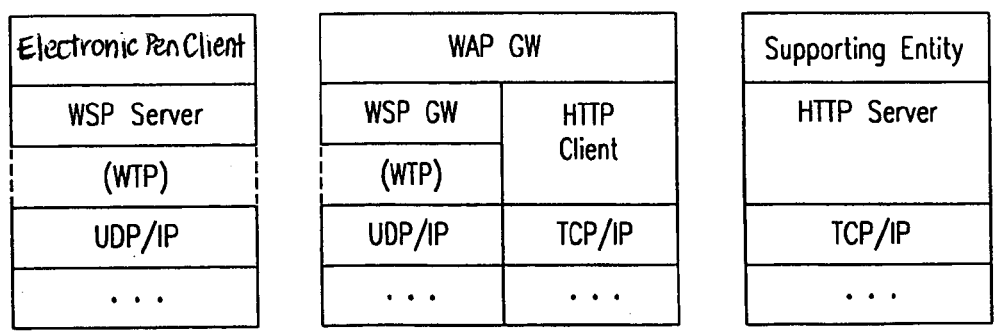
FIG. 5 is an illustration of a protocol stack for communications between an electronic pen client and each of the supporting entities when the electronic pen client is not located within a server on the Internet.
Figure 6:
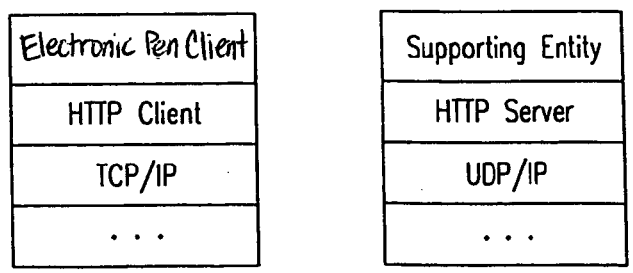
FIG. 6 is an illustration of protocol stacks that are used for communications between an electronic pen client and each of the supporting entities when the electronic pen client is located on the Internet.

Referring now to FIGS. 3 through 6 there are illustrated various examples of protocol stacks that can be used for communicating between the entities shown in FIG. 2. Generally, however, such protocols apply however, only if the two communicating entities are implemented in different devices. If two or more entities are combined into one device, a proprietary protocol can be used to communicate between the entities. FIG. 3 illustrates the protocol stacks that can be used in the case of local communications (e.g., using Bluetooth) between the electronic pen 10 and the electronic pen client 22. If, on the other hand, the electronic pen 10 and the electronic pen client 22 communicate with one another via an Internet connection, the protocol stacks depicted in FIG. 4 will be used. FIG. 5 illustrates a protocol stack for communicating between the electronic pen client and each of the supporting entities, such as the name server 26, the control node 24, the base translator 28, and the application server 30, when the electronic pen client 22 is not contained within a server on the Internet (e.g., such as when the electronic pen client 22 is located in a mobile phone 14). Finally, FIG. 6 depicts the protocol stacks that are used when the electronic pen client 22 is located on the Internet.

There are a number of procedures that can be used by the various entities in the system 2 to allow the system to operate properly. When the electronic pen 10 detects a position on the address pattern that is not within its currently loaded grid or when the electronic pen 10 has no currently loaded grid, the electronic pen 10 initiates a new grid procedure. The new grid procedure involves sending a new grid request object to the electronic pen client 22. The new grid request object contains the newly detected position, a description of the actions that the electronic pen 10 can natively support, and a description of the output signals that the electronic pen 10 supports. The reply to a new grid request object is a grid description, which can be provided by the electronic pen client 22 from its own internal memory or from the information provided by an application server 30. Generally, the electronic pen client 22 extracts the grid description from an application description received from the application server 30. The grid description should only contain action-field-types that the electronic pen 10 has indicated that it natively supports, which means that the electronic pen client 22 in some cases should convert the extracted grid description into a format that the electronic pen 10 can understand.

In some situations, it may be necessary for the electronic pen 10 to unload its current grid at the request of the electronic pen client 22. In such a case, the electronic pen client 22 sends an empty grid description to the electronic pen 10, thereby causing the electronic pen 10 to unload its current grid. This can occur, for example, when a particular application is complete or when a new grid description request received from the electronic pen 10 cannot be fulfilled, such as when the position received from the electronic pen 10 is not registered in the name server 26.

Another similar message is the empty grid description with a grid exception. When the electronic pen 10 requests a new grid description from the electronic pen client 22, the electronic pen client 22 uses the detected position specified in the request to ask the name server 26 for a URL where the application description can be found. If no URL is returned, the electronic pen client 22 can send an empty grid description with a grid exception to the electronic pen 10. The grid exception comprises a rectangle or other shape indicating the area around the detected position where no registered applications can be found. Preferably, the indicated area is as large as possible so that the electronic pen 10 and/or electronic pen client 22 know the extent of the surrounding area that is unassigned and do not have to repeatedly send requests to the name server 26. Thus, the empty grid description with a grid exception causes the electronic pen 10 to unload its current grid and also informs the electronic pen 10 of an area surrounding the detected position that can essentially be ignored because its is not associated with any application.

The procedure that is used when the electronic pen 10 detects a new position is a find application description location procedure. This procedure is used by the electronic pen client 22 to translate a detected position received from the electronic pen 10 into a URL where a description of an application corresponding to that position can be found. The procedure involves sending a request from the electronic pen client 22 to the name server 26 containing identification of the detected position. The name server 26 responds by sending a reply to the electronic pen client 22 containing a URL where an application description can be found or, if the detected position is not registered in the name server 26, containing an indication that no associated application is known to exist.

Once the electronic pen client 22 knows the URL where an application description can be found, the electronic pen client 22 can initiate a get application description procedure, which allows the electronic pen client 22 to retrieve the application description from the application server 30. In particular, the electronic pen client 22 sends an application description request containing a unique ID for the requesting electronic pen 10 and/or electronic pen client 22 to the application server 30 located at the URL address provided by the name server 26. In response, the application server 30 provides an application description object to the electronic pen client 22, which loads the application onto the electronic pen client 22. The application description object is similar to an HTML form with some additions and modifications.

Furthermore, the application description object can be sent from the application server 30 to the electronic pen client 22 in response to a submitted form (i.e., a submission of one completed form might automatically result in a new form being loaded onto the electronic pen client 22). A related procedure is the application submit procedure, which is used by the electronic pen client 22 when the user of the electronic pen 10 selects a "submit" field in a form. In response to the selection of the "submit" field, the electronic pen client 22 will submit the form content in accordance with instructions received in the application description. Typically, the electronic pen client 22 will submit the form content, in the same way as a regular web browser, to a URL specified in a form tag of the application description.

When an action that can be handled by the electronic pen 10 itself is generated, an action procedure is initiated by the electronic pen 10 to send an action request object to the electronic pen client 22. If the electronic pen client 22 cannot translate the action into a field value itself, the electronic pen client 22 further forwards the request to a base translator 28 for translating the action into a field value. In response to the action request object, an action reply object is sent from the electronic pen client 22 to the electronic pen 10. The action reply object contains output information that indicates to the electronic pen 10 which outputs signals to use. The output information, however, cannot be of type that the electronic pen 10 has previously indicated that it does not support. In some instances, the action reply object might contain a new grid description. In such a case the electronic pen 10 will unload its current grid description and load the new grid description. Similarly, if the action reply object contains an empty grid description, the electronic pen 10 will simply unload its current grid description.

The action request object is also sometimes used to specify actions that should be processed by the control node 24. In this instance, the electronic pen client 22 initiates a control procedure by forwarding the received action to the appropriate control node 24. As a result, the control node 24 sends an action reply object to the electronic pen client 22.

The operation of the electronic pen 10 will now be discussed in greater detail. Each electronic pen 10 has a unique pen ID, which is sent to the application server 30 when an application description is requested. The electronic pen ID allows the application to identify the particular user that is using the application and to distinguish between multiple concurrent users of the same application, such as when different electronic pens 10 are being used in connection with separate sheets of paper that each contain the same portion of the address pattern.

Figure 7:
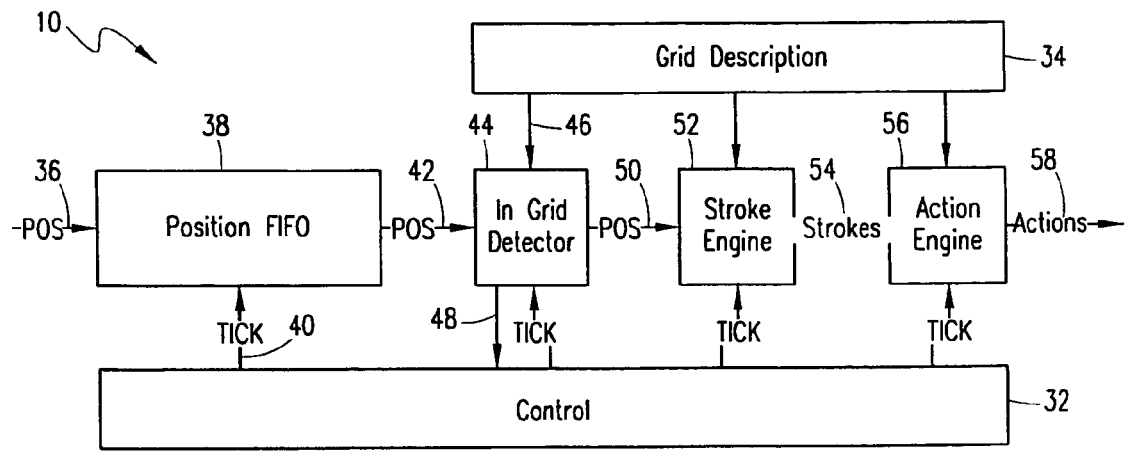
FIG. 7 is a block diagram of the electronic pen logic that handles positions, strokes, actions, and grid descriptions.

Referring now to FIG. 7, there is illustrated a block diagram of the electronic pen logic that handles positions, strokes, actions, and grid descriptions for the electronic pen 10. The electronic pen 10 includes a control block 32 for controlling the operation of the electronic pen 10. A grid description block 34 represents a memory location that stores a current grid description. At any given time, the electronic pen 10 can be in either of two modes. In a first mode, a grid description is loaded, while in a second mode, the grid description block 34 is not loaded with a current grid description.

As the electronic pen 10 moves across an address pattern, the electronic pen 10 periodically (e.g., every ¹⁄₁₀₀ of a second) detects a position by detecting all of the dots within, for example, a 3 mm by 3 mm area. Each detected position is forwarded (as indicated at 36) to a position first in first out (FIFO) block 38, which acts as a buffer for temporarily storing the detected positions. The clocking of the position FIFO block 38 is controlled by the control block 32 (as indicated at 40).

The detected position is fed from the position FIFO block 38 (as indicated at 42) to an in grid detector 44. The in grid detector 44 retrieves data from the grid description block 34 (as indicated at 46) and determines whether the received position is within the loaded grid description. If not, the in grid detector 44 notifies the control block 32, which in turn initiates a request for a new grid. When the detected position is within the current grid, the position is then sent (as indicated at 50) from the in grid detector 44 to a stroke engine 52. The stroke engine 52 converts the received positions into strokes, which are then sent (as indicated at 54) to an action engine 56. A complete stroke is created when the electronic pen 10 is lifted from the paper or when it moves outside of the grid field where the stroke began. Finally, the action engine 56 converts the received stroke into an action that can be sent to the electronic pen client 22. By using grid action-field-types, the action engine knows which type of action to produce for a specific grid field.

Figure 8:
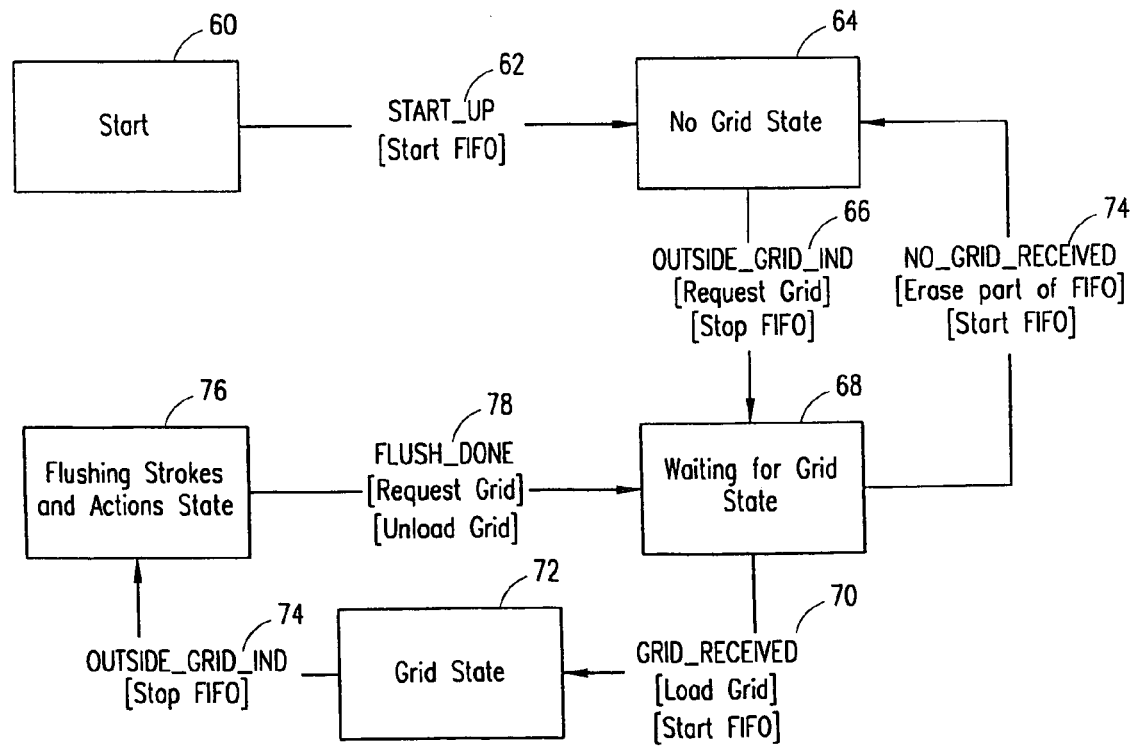
FIG. 8 is a block diagram of a state machine for the electronic pen control block shown in FIG. 7.

Referring now to FIG. 8, there is illustrated a block diagram of a state machine for the control block 32 shown in FIG. 7. In this figure, events are indicated in capital letters, while tasks associated with the event are depicted in brackets. The process starts at step 60 with a start up event 62, which causes the position FIFO block 38 to begin receiving detected positions. Initially, the electronic pen 10 is in a no grid loaded state 64, which means that the electronic pen 10 does not have a grid loaded in the grid description block 34. As a result, the control block 32 generates an outside grid indication 66, thereby causing the electronic pen 10 to send the request for a new grid description to the electronic pen client 22 (i.e., in accordance with the new grid procedure) and to stop the FIFO buffer 38. At this point, the electronic pen 10 enters a waiting for grid state 68.

Once the new grid has been received (as indicated at 70), the control block 32 moves to a grid loaded state 72, at which time the new grid is loaded into the grid description block 34 and the position FIFO block 38 resumes operation. On the other hand, if no grid is received (as indicated at 74), at least a portion of the positions stored in the FIFO buffer 38 are erased. Which part of the FIFO buffer to erase is determined by the grid exception area, if any, in the received empty grid description. Accordingly, all positions stored in the FIFO buffer 38 that are within the grid exception area should be erased. If no grid exception is received, the stroke associated with the position is erased. In addition, the FIFO block 38 resumes operation and the control block 32 moves into the no grid loaded state 64.

When the control block 32 is in the grid loaded state 72, a current grid is loaded in the grid description block 34. While the control block 32 remains in this state 72, the position FIFO block 38 continues to receive detected positions and passes them on to the stroke engine 52 and action engine 56. Actions produced by the action engine 56 are sent (as indicated at 58) to the electronic pen client 22 (i.e., in accordance with the action procedure described above).

At some point, an outside grid indication 74 may be received by the control block 32 from the in grid detector 44. The outside grid event 74 causes the FIFO block 38 to stop generating new positions. In addition, the electronic pen 10 enters a flushing stroke and action state 76 wherein the strokes that are currently in the stroke engine 52 and the actions that are currently in the action engine 56 are flushed to the electronic pen client 22. Once the stroke engine 52 and action engine 56 have been fully flushed (as indicated at 78), the electronic pen 10 sends a request for a new grid to the electronic pen client 22 and unloads the current grid. The control block 32 then moves back into the waiting for grid state 68.

As a general matter, the electronic pen 10 may be capable of supporting various different types of output, including audio, such as warning tones; visual, such as a flashing light; tactile, such as vibration; and/or ink. In some cases, it might be desirable to allow the user of the electronic pen 10 to turn off the ink of the pen 10, such as when the electronic pen is being used on a portion of the address pattern that is public or shared or when the user wants to be able to reuse the current sheet of paper.

The electronic pen client 22 will now be described in greater detail. Generally, the electronic pen client 22 is analogous to a regular web browser. It is responsible for loading applications from application servers 30 and for handling input form the electronic pen 10. Preferably, the electronic pen client 22 is located in a separate device from the electronic pen 10 itself. This is because it is desirable to minimize the size and power supply requirements of the electronic pen 10, which will likely be adversely affected by the processing resources and memory necessary to support the functions of the electronic pen client 22.

Figure 9:
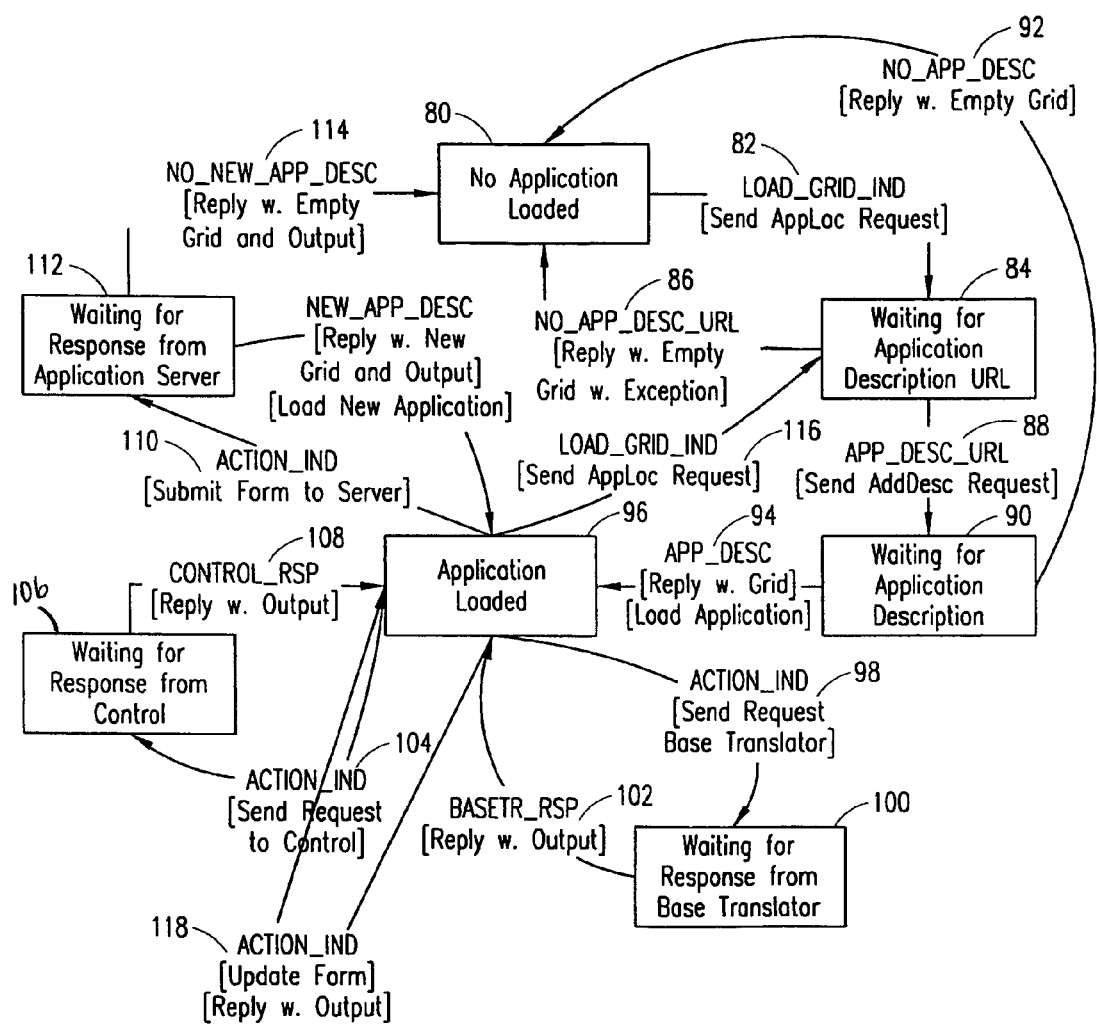
FIG. 9 is a block diagram of a state machine for an electronic pen client.

Referring now to FIG. 9, there is illustrated a block diagram of a state machine for the electronic pen client 22. Initially, the electronic pen client 22 is in a no application loaded state 80. The electronic pen client 22 recognizes only one signal when in this state 80, namely a new grid request from the electronic pen 10. Such a request causes a load grid indication event 82. The electronic pen client 22 responds by sending a request to the name server 26 to translate a position contained within the new grid request into a URL where the application description can be found (i.e., in accordance with the find application location procedure). Next, the electronic pen client 22 enters a waiting for application description URL state 84. If no URL for the application description can be found (as indicated at 86), the electronic pen client 22 sends a new grid reply to the electronic pen 10, wherein the reply contains an empty grid description with a grid exception. As a result, the electronic pen client 22 returns to the no application loaded state 80.

If a URL for the application description is received from the name server 26 (as indicated at 88), the electronic pen client 22 sends a request to the application server 30 to retrieve the application description (i.e., in accordance with the get application description procedure). Accordingly, the electronic pen client 22 enters a waiting for application description state 90.

If the electronic pen client 22 does not receive an application description from the application server 30 (as indicated at 92), a new grid reply is sent by the electronic pen client 22 to the electronic pen 10 wherein the reply contains an empty grid. Thus, the electronic pen client 22 returns to the no application loaded state 80. If, however, the electronic pen client 22 does receive an application description from the application server 30 (as indicated at 94), the electronic pen client 22 sends a new grid reply to the electronic pen 10 containing a new grid description, and the electronic pen client 22 loads the application in its memory. In addition, the electronic pen client 22 moves into an application loaded state 96.

In the application loaded state 96, five types of actions can be received by the electronic pen client 22 from the electronic pen 10. First, a received action can include a request that the electronic pen client 22 cannot handle itself, in which case the electronic pen client 22 will send the action to the base translator 28 (as indicated at 98). The electronic pen client 22 then moves into a waiting for response from the base translator state 100. Once a base translator response 102 is received by the electronic pen client 22, the electronic pen client 22 updates a current form or other data associated with the currently loaded application and sends an action reply to the electronic pen 10 with appropriate output information.

Another type of action that the electronic pen client 22 can receive from the electronic pen 10 is a request that should be forwarded to a control node 24. In such a case, the action is sent to a control URL specified in the application description (as indicated at 104), and the electronic pen client 22 enters a waiting for response from the control state 106. Once a response is received from the control (as indicated at 108), the electronic pen client 22 sends an action reply to the electronic pen 10 with appropriate output information.

A third type of action is a submit form request, in response to which the electronic pen client 22 will submit the current form to the application server 30 that is identified by the URL in the application description (as indicated at 110). The electronic pen client 22 then enters a waiting for response from the application server state 112. If the application server 30 responds by sending an empty application description to the electronic pen client 22 (as indicated at 114), the current application is unloaded from the electronic pen client 22 and an action reply is sent to the electronic pen 10 with an empty grid. As a result, the electronic pen client 22 returns to the no application loaded state 80. On the other hand, if the application server 30 responds with a non-empty application description, the old application is unloaded from the electronic pen client 22, the new application description is parsed and loaded in the electronic pen client 22, an action reply is sent to the electronic pen 10 with a new grid description and with appropriate output information, and finally the electronic pen client 22 returns to the application loaded state 96.

A fourth type of action that can be received by the electronic pen client 22 from the electronic pen 10 is a request to load a new grid. This action occurs, for example, when a position outside of the current grid is detected by the electronic pen 10. When a new grid request is received, the electronic pen client 22 sends a request to the name server 26 (as indicated at 116) and the electronic pen client 22 returns to the waiting for application description URL state 84.

Finally, a fifth type of action that can be received by the electronic pen client 22 is an action that the electronic pen client 22 can handle itself, in which case the electronic pen client 22 updates the current form and sends an action reply to the electronic pen 10 with appropriate output information (as indicated at 118). The electronic pen client 22 then remains in the application loaded state 96. One type of action that the electronic pen client 22 might be able to handle itself is a local application. For example, the electronic pen client 22 might be capable of performing certain basic functions that are defined by a local application. Thus, when the electronic pen client 22 receives a new grid request, the position associated with the new grid request can be analyzed to determine if it corresponds to a local application. If so, the electronic pen client 22 can load the application description from its local memory, send a new grid description to the electronic pen 10 without having to communicate with the name server 26 or the application server 30.

Another action that might be handled locally by the electronic pen client 22 relates to the selection of fields within a form. When the electronic pen client 22 receives an action, the field that corresponds to that action receives focus. When this occurs, the electronic pen client 22 might display the field's value on its display or output the value by audio. In addition, the electronic pen client 22 might allow the user to edit the value of the field by means other than the electronic pen 10. Yet another type of action that might be handled by the electronic pen client 22 itself are actions that relate to a clipboard function. When a "copy" field is selected, the value of the field that had focus at the time the copy field was selected is transferred to the clipboard. Similarly, when a "paste" field is selected, the value stored in the clipboard is transferred to the field that had focus at the time the paste field was selected.

Figure 10A:
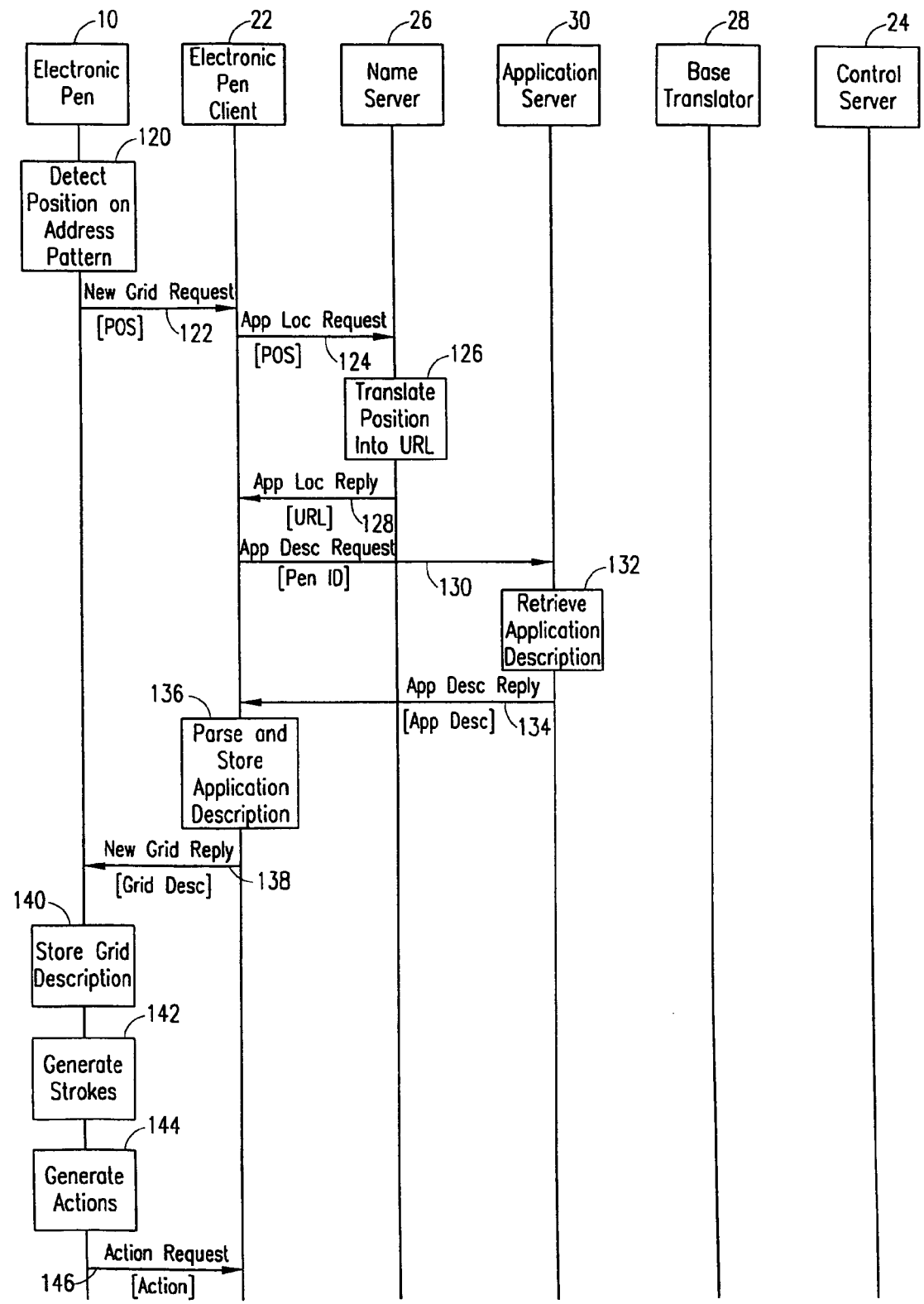
FIGS. 10A–10C are a message flow and signaling diagram illustrating the operation of the electronic pen system shown and discussed in connection with FIG. 2.
Figure 10B:
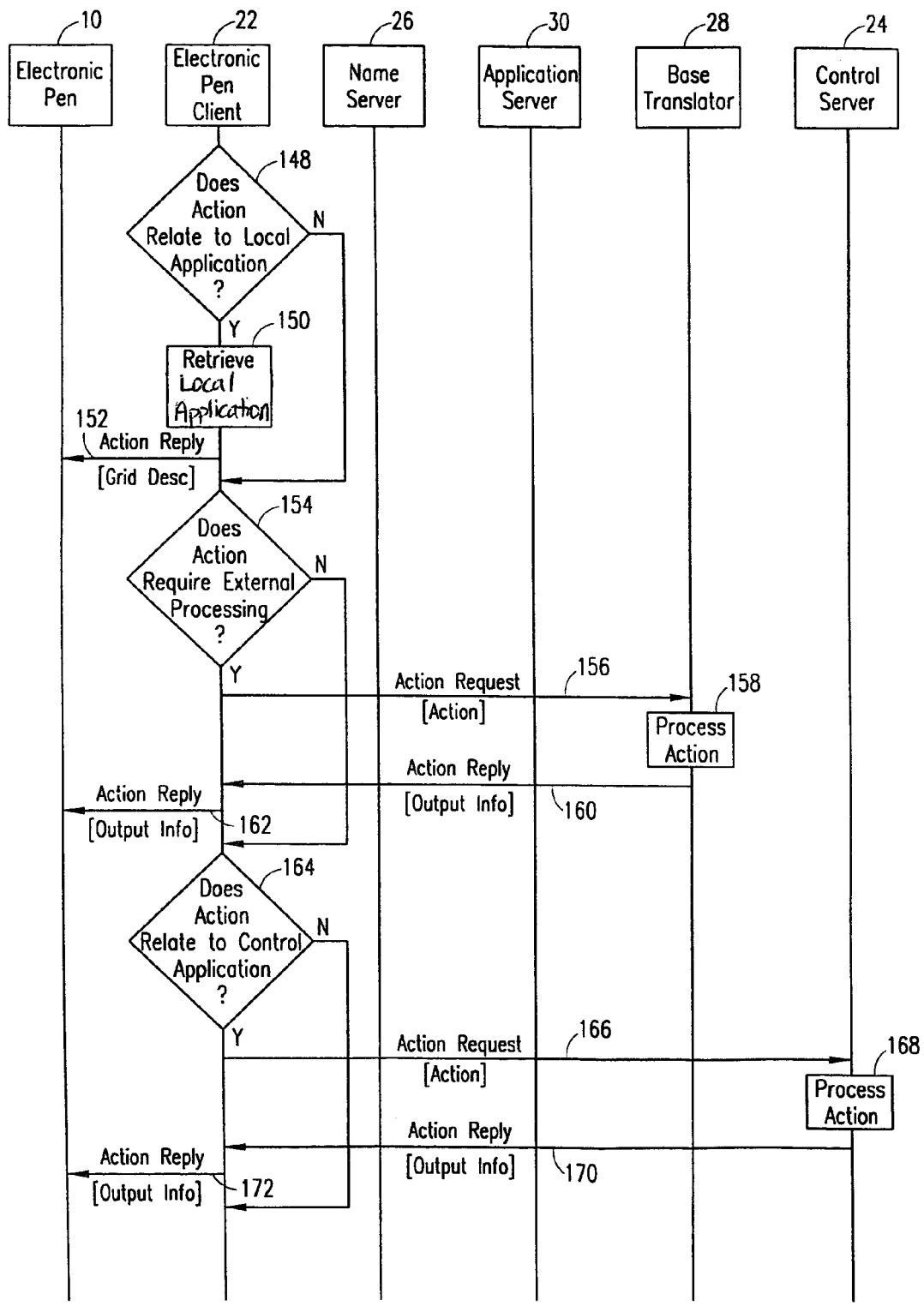
Figure 10C:
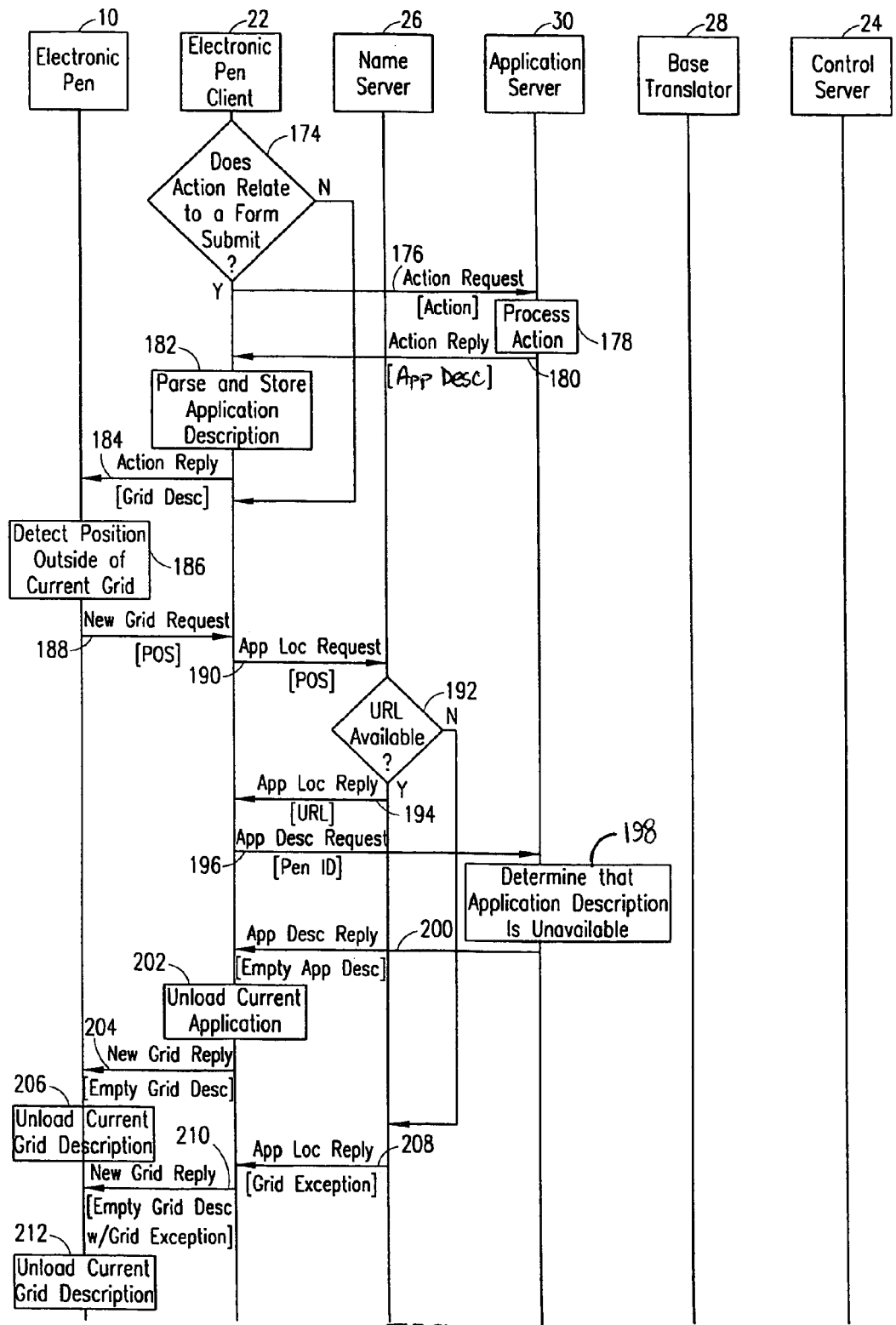

Referring now to FIGS. 10A through 10C, there is shown, by way of example, a message flow and signaling diagram illustrating the operation of the electronic pen system 2 depicted in and discussed in connection with FIG. 2. Initially, the electronic pen 10 detects a first position on the address pattern at step 120 (e.g., at a location on a sheet of paper designated for composing and sending emails). At this stage, it is assumed that the electronic pen 10 is in a no grid loaded state. Thus, in response to the detection of the first position, the electronic pen 10 sends a new grid request 122, which contains the detected position information, to the electronic pen client 22. As a result, the electronic pen client 22 sends an application location request 124 containing the detected position information to the name server 26, at step 126. The name server 26 translates the detected position into a URL where an application description that corresponds to the detected position can be found (e.g., a URL address for a server containing an email application), and returns an application location reply 128 containing the retrieved URL to the electronic pen client 22.

The electronic pen client 22 then sends an application description request 130, which contains the unique pen ID for the electronic pen 10, to the application server 30. The application server 30 retrieves the application description at step 132 and sends an application description reply 134 containing the retrieved application description to the electronic pen client 22. The electronic pen client 22 then parses and stores the application description at step 136. This step further involves generating a current grid description from the application description and sending the grid description to the electronic pen 10 in a new grid reply 138. The electronic pen 10 stores the received grid description at step 140 and resumes processing of the detected positions. Using the detected positions and the information in the grid description (e.g., so that the electronic pen 10 knows which fields of the email form are being filled in), the electronic pen 10 generates strokes at step 142 and generates actions at step 144 using the stroke engine 52 and action engine 56 shown in FIG. 7.

Each time an action is generated that cannot be handled by the electronic pen 10 itself, an action request 146 containing a description of the action is sent from the electronic pen 10 to the electronic pen client 22. At this point, the electronic pen client 22 should determine what type of action has been received so that it can respond to the action in an appropriate manner. First, it is determined whether the action requires the attention of, or otherwise should be processed in accordance with, a local application at step 148. Very basic applications or frequently used applications (e.g., delete entered text), for example, might be stored locally to avoid having to contact another entity. In such a case, the electronic pen client 22 retrieves the local application at step 150 and sends an action reply 152, which can contain a new grid description or other appropriate information.

However, if it is determined at step 148 that the received action does not relate to a local application, the process continues at step 154 where it is determined whether the received action requires processing by an external translator (e.g., handwriting recognition). If so, an action request 156 containing a description of the action is sent by the electronic pen client 22 to the base translator 28. The base translator 28 processes the action at step 158 and sends an action reply 160 containing output information responsive to the received action (e.g., text corresponding to written characters) to the electronic pen client 22, which can forward the output information to the electronic pen 10 in an action reply 162, if necessary.

If it is determined at step 154 that the received action does not require processing by an external translator, it is next determined whether the action relates to a control application at step 164. If so, an action request 166 containing a description of the action is sent by the electronic pen client 22 to the control server 24. The control server 24 processes the received action at step 168 and, if a response is necessary, returns output information responsive to the received action in an action reply 170, which is forwarded from the electronic pen client 22 to the electronic pen 10 in an action reply 172.

Assuming that it is determined at step 164 that the received action does not relate to a control function, it is next determined whether the action comprises a request to submit a form at step 174 (e.g., a selection of a "send" area on the email form). If so, an action request 176 containing the data entered onto the form is sent by the electronic pen client 22 to the application server 30. The application server 30 processes the form at step 178 and sends an action reply 180 containing a new application description (or an empty application description) to the electronic pen client 22. The electronic pen client 22 parses and stores the new application description at step 182 and generates a new grid description from the newly received application description. The electronic pen client 22 then sends an action reply 184 containing the new grid description. Although not illustrated in the figure, the electronic pen 10 will typically respond to the receipt of a new grid description by unloading its current grid description and loading the new grid description into its memory.

At some point, it is assumed that the electronic pen 10 detects a position that is outside of the currently loaded grid at step 186. In response to such an event, the electronic pen 10 sends a new grid request 188 containing the newly detected position data to the electronic pen client 22. In response, the electronic pen client 22 again generates an application location request 190 containing the detected position data and sends the request to the name server 26. The name server 26 determines whether a URL for an application description that corresponds to the newly detected position is available at step 192.

If so, the name server 26 sends an application location reply 194 containing a retrieved URL to the electronic pen client 22, which in turn sends an application description request 196 containing the unique pen ID for the electronic pen 10 to the application server 30 at the identified URL address, just as previously discussed in connection with messages 128 and 130. In this case, however, it is assumed that the application server 30 determines that the requested application description is unavailable at step 198. As a result, the application server 30 sends an application description reply to the electronic pen client 22 containing an empty application description. In response to the receipt of an empty application description, the electronic pen client 22 unloads the current application at step 202 and sends a new grid reply 204 containing an empty grid description to the electronic pen 10. The electronic pen 10 responds to the receipt of the empty grid description by unloading the current grid description at step 206.

Another possibility is that the name server 26 determines at step 192 that a URL corresponding to the detected position is not available. In this situation, the name server 26 sends an application location reply 208 to the electronic pen client 22. The reply 208 may simply be empty to indicate that a URL is not available. Preferably, however, the reply 208 contains a grid exception defining the largest area possible around the detected position for which there is no corresponding URL. In response to the reply 208, the electronic pen client 22 sends a new grid reply 210 containing an empty grid description with a grid exception. Upon receiving the reply 210, the electronic pen 10 unloads the current grid description at step 212. Furthermore, assuming that the electronic pen 10 receives and recognizes the grid exception information, the electronic pen 10 may subsequently be able to determine that certain detected positions on the address pattern are not associated with any application without having to send a request to the name server 26 or the application server 30.

In accordance with the present invention, the electronic pen 10 can be used in connection with specially formatted paper 12 to facilitate electronic recordation of a transaction, such as a check or other negotiable instrument. Preferably, the electronic pen 10 also includes or supports a security function for preventing unauthorized use of the electronic pen 10. Furthermore, by transmitting data regarding the transaction to a remote server (e.g., a web site for the account-holder's bank), an authorization, validation, and/or confirmation of the transaction can be performed.

Figure 11:
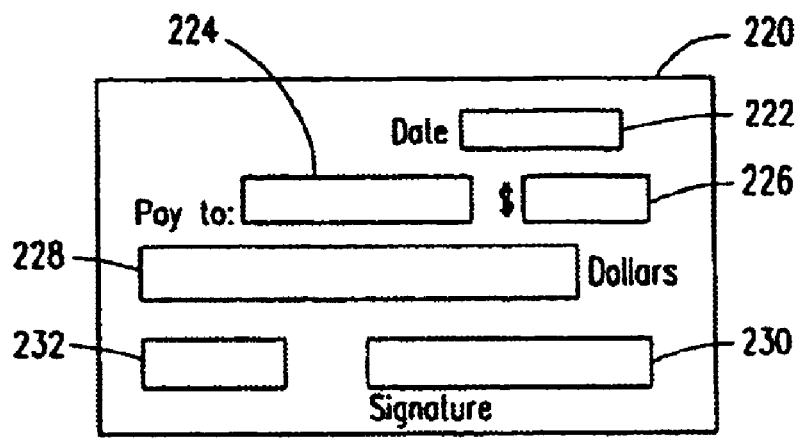
FIG. 11 is an illustration of a check for use in connection with one embodiment of the present invention.

Referring now to FIG. 11, there is illustrated a check 220 for use in connection with one embodiment of the present invention. As with ordinary checks, the check 220 includes a plurality of data entry fields, including a date field 222, a "payable to" field 224, a numerical dollar amount field 226, a textual dollar amount field 228, and a signature field 230. In this example, the check 220 further includes a personal identification number (PIN) field 232 for use in entering a unique user PIN. In addition, each of the fields of the check 220 include a background address pattern (not shown). When the account-holder's electronic pen 10 is used to write information in the fields of the check 220, the written information can be detected by the electronic pen 10. This information can then be stored in the electronic pen 10 and/or transmitted to an application server 30 (e.g., a bank web site) for storage and/or processing.

To use the check 220, the account-holder writes the sum in the appropriate dollar amount fields 226 and 228, fills in the other appropriate fields, and signs the check 220 in the signature field 230 using his or her electronic pen 10. In one embodiment of the invention, the address pattern is uniquely associated with the particular account holder and/or the account-holder's electronic pen 10. Accordingly, the check 220 can be identified as being associated with the account holder. Once the information is written on the check 220 with the electronic pen 10, the information, along with a unique electronic pen identifier, is sent to the bank (i.e., at the bank's web address) to immediately inform the bank of the amount and that the account holder has signed the check 220. In addition, the bank server can compare the received signature information with a stored signature image to confirm that the check 220 has been executed by the authorized account holder. Preferably, the information sent to the bank is ciphered or coded in some way to provide extra security.

By requiring that the check 220 be signed using the user's electronic pen 10 and with the user's own signature to have a valid transaction, this transaction system provides protection against unauthorized check-writing in case the user loses his or her checks 220 or electronic pen 10. In addition, by requiring the user of the electronic pen 10 to first enter a correct PIN code in the PIN field 232, additional protection can be provided even if the user loses both the checks 220 and the electronic pen 10. Thus, checks 220 or other negotiable instruments can only be signed: (1) on the portion of the address pattern assigned to the user; (2) with the user's specific electronic pen 10; and (3) after the user has initialized the electronic pen 10 with the appropriate PIN. Although the PIN field 232 is depicted as being on the check 220 itself, it is also possible to implement a PIN field 232 for unlocking the electronic pen 10 on any other formatted surface.

In addition, a PIN can be used for enabling the electronic pen 10 in connection with other secure functions. For instance, the electronic pen 10 might be associated with a user account or subscription that enables service providers to charge the user, or some other entity associated with the user, each time the electronic pen 10 is used, at least for some functions. Accordingly, it is important to provide a mechanism for preventing unauthorized users from using the electronic pen 10. By requiring that a PIN code be correctly entered before allowing a user to access certain secure functions, unauthorized use of the electronic pen 10 can be prevented.

In accordance with the present invention, the electronic pen 10 provides feedback to facilitate the entry of PIN code. In a preferred embodiment, the electronic pen 10 communicates feedback using certain vibration schemes. For example, each time the electronic pen 10 requests that a user enter a PIN, the electronic pen 10 shakes three times in rapid succession. Once a correct PIN code is entered, the electronic pen 10 vibrates once to indicate that it is ready to use. On the other hand, if the wrong PIN code is entered, the electronic pen 10 again vibrates three times in rapid succession to prompt the user to enter the PIN code. If the user enters the wrong PIN code too many times (e.g., ten times), the electronic pen 10 is locked.

When entering the locked state, the electronic pen 10 rapidly vibrates four times, thereby indicating that the user must enter a personal unlock key (PUK) code, which consists of ten symbols compared with the four symbols that are used for the PIN code. When the electronic pen 10 is in the PIN code entry mode, positions detected by the electronic pen 10 are not forwarded by the electronic pen 10. Instead, the detected positions are interpreted as symbols for the PIN code that is associated with the electronic pen 10.

Preferably, the electronic pen 10 remains unlocked for a predefined amount of time (e.g., two hours) after the correct PIN code is entered so that the user does not need to enter the PIN code each time the electronic pen 10 is turned on. Thus, when the electronic pen 10 is turned on during this predefined period, it simply vibrates once to indicate that it is ready to use. Furthermore, the user might be able to reset the two hour timer to ensure that a PIN code is required the next time the electronic pen 10 is turned on. This resetting can be performed, for instance, by clicking in a box on a special laminated paper that comes with the electronic pen 10.

Another option is to allow the user to enter a special PIN code (e.g., "0000"), instead of the unlocking PIN code, to set the electronic pen 10 in an unsafe mode. When the user enters the unsafe code, the electronic pen 10 vibrates one time to indicate that it is ready to use. While the electronic pen 10 remains in the unsafe mode, it can only be used in connection with services that do not have associated usage charges.

The PIN code can be entered in numerous different ways. In one embodiment, each of the four symbols in the PIN code are selected from a set of ten symbols that can each be written using only one stoke (e.g., the entire symbol can be written without lifting the electronic pen 10 from the writing surface). For example, the ten symbols could be selected from the following characters: -, |, <, >, /, \, O, S, Δ, □, L, U, N, M, V, ^, [, ], z, J, and C. Which ten of these symbols is used might depend on how easy they are to decode and how user-friendly they are. By using only symbols that can be written using one stroke, decoding of the PIN code in the electronic pen 10 can be simplified and made more stable, which is beneficial when entering PIN codes. In another embodiment, regular digits (e.g., 0–9) can be used. Although this solution might increase the complexity of the decoding software, the use of digits might seem more natural to users. In yet another embodiment, PIN code entry uses a laminated paper that has printed thereon the digits 0–9. To enter the PIN code, the user "clicks" on the correct four digits (e.g., by touching the tip of the electronic pen 10 to the digits) to enter the PIN code.

In either of the first two PIN entry alternatives, the PIN code can be written on any addressed paper when the electronic pen 10 is in the PIN code entry mode. For security reasons, however, it might be desirable not to write the PIN code on paper. Accordingly, the electronic pen 10 is preferably capable of writing the PIN code without leaving traces on the paper. This capability can be supported by using the electronic pen 10 in a non-ink mode or by writing n a special glossy paper (i.e., a laminated paper) that does not retain ink.

Another desirable capability is to allow the user to change the PIN code for the electronic pen 10. This capability could typically be done by "clicking" on a box (e.g., a change PIN code field) on a specially formatted paper. Of course, such a "change PIN code" function could only be initiated after entering the correct present PIN code to ensure that the user is authorized. When the electronic pen 10 is in the "change PIN code" mode, the user writes his new PIN code. The electronic pen 10 could then vibrate one time to acknowledge that the PIN code has been changed.

To support PIN code security functions, the electronic pen 10 needs to include a memory for storing the correct PIN code and a processor for identifying the user-entered PIN code and comparing the identified PIN code with the stored PIN code to determine whether there is a match. Positions on the address pattern detected by a sensor in the electronic pen 10 are converted, by the processor, into an electronic version of the information. The electronic version is then correlated with the stored PIN code using the processor. If there is a match, then the electronic pen 10 is unlocked.

In an alternative embodiment, the electronic pen 10 can include a picture sensing device 234, in addition to the sensor 236 used for detecting portions of the address pattern, for detecting a fingerprint or other unique physical attributes (e.g., a corneal scan) of the user.

Figure 12:
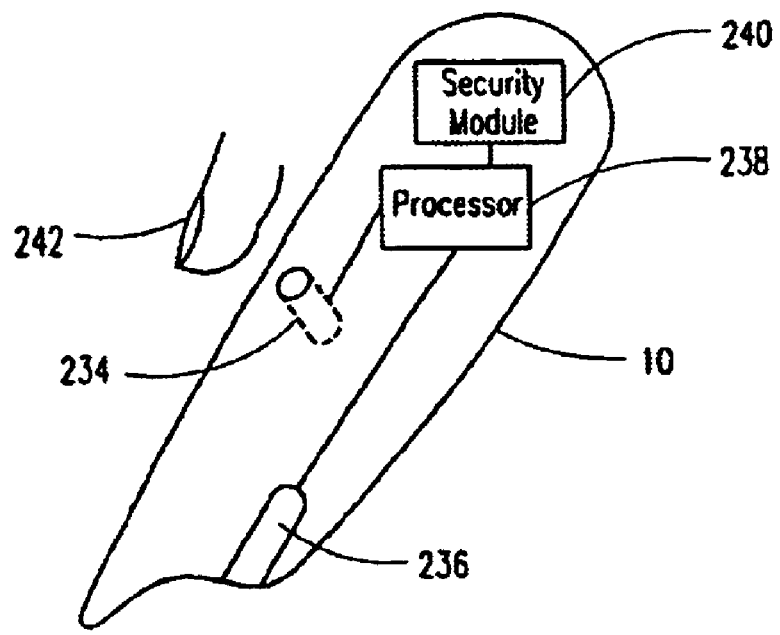
FIG. 12 is a schematic diagram of an electronic pen having a fingerprint sensor in accordance with one embodiment of the present invention.

Referring now to FIG. 12, there is illustrated an electronic pen 10 having a fingerprint sensor 234 in accordance with one embodiment of the present invention. To initialize or unlock the electronic pen 10, the user holds a finger over the fingerprint sensor 234, which captures an image of the fingerprint and forwards the image to a processor 238 that controls the electronic pen 10. The processor 238 uses a security module 240 to confirm that the user is an authorized user by comparing the fingerprint image with stored fingerprint information. If the fingerprint image corresponds to the stored fingerprint information, the electronic pen 10 is enabled.

Such a security function can be used to prevent unauthorized users from using the electronic pen 10 in connection with certain secure functions, such as executing a negotiable instrument. In addition, such a security function can be used to restrict unauthorized use of the electronic pen 10 in connection with "public" key functions (e.g., general use applications that are not restricted to a particular user).

Although various preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims. Furthermore, it shall be understood that the terms "comprises" and "comprising," when used in the foregoing Detailed Description and the following claims, specifies the presence of stated features, elements, steps, or components but does not preclude the presence or addition of one or more other features, elements, steps, components, or groups thereof.

What is claimed is:

1. A system for electronically recording a transaction, comprising:
    a formatted surface including a data entry field that includes an address pattern;
    an electronic reading device including a position sensor for detecting positions of the electronic reading device relative to the address pattern as information is written in the data entry field, wherein a unique position on the address pattern is identified from an examination of a portion of the address pattern, and wherein the positions of the electronic reading device are used to generate an electronic reproduction of the written information; and
    a server for receiving the electronic reproduction of the written information.

2. The system of claim 1, wherein the formatted surface comprises a negotiable instrument.

3. The system of claim 2, wherein the server further stores the received electronic reproduction in connection with a user account associated with the electronic reading device.

4. The system of claim 2, wherein the data field comprises a signature field, the server further operating to compare the electronic reproduction of the written information with a stored user signature.

5. The system of claim 4, wherein the server authorizes a transaction if the electronic reproduction corresponds to the stored user signature.

6. The system of claim 2, wherein the server authorizes a transaction based on a determination of whether the formatted surface is allocated for use in connection with the electronic reading device.

7. The system of claim 1, wherein the data field comprises a personal identification number (PIN) field, the server further operating to compare the electronic reproduction of the written information with a stored PIN.

8. The system of claim 1, wherein the electronic reading device ciphers the electronic reproduction of the written information for transmission to the server.

9. A method for electronically recording a transaction, comprising the steps of:
    detecting a plurality of positions of an electronic reading device with respect to a particular address pattern on a formatted surface, said plurality of positions corresponding to information written on the formatted surface with the electronic reading device;
    identifying a unique position on the address pattern from an examination of a portion of the address pattern;
    determining whether an identifier for the electronic reading device is associated with the particular address pattern; and
    establishing whether the written information is valid based on said determination.

10. The method of claim 9, wherein the formatted surface comprises a negotiable instrument.

11. The method of claim 10, wherein the written information comprises a signature, the method further comprising the step of correlating the plurality of positions with stored signature data.

12. The method of claim 10, further comprising step of sending the plurality of positions to a server for providing confirmation of the negotiable instrument.

13. The method of claim 9, further comprising the step of enabling the electronic reading device only if a personal identification number (PIN) written with the electronic reading device corresponds to stored PIN data.

14. An electronic reading system, comprising:
    an electronic reading device including a position sensor for detecting positions of the electronic reading device relative to an address pattern on a formatted surface, wherein a unique position on the address pattern is identified from an examination of a portion of the address pattern;
    a memory for storing a preselected code; and
    a processor for converting the detected positions into an entered code and for comparing the entered code with the stored preselected code, wherein the electronic reading device is enabled for at least one function if the entered code matches the stored preselected code.

15. The system of claim 14, wherein the electronic reading device further comprises the memory and the processor.

16. The system of claim 14, wherein the stored preselected code comprises a personal identification number (PIN) code.

17. The system of claim 16, wherein the PIN code comprises a plurality of symbols selected from a set of symbols that can be written with one stroke.

18. The system of claim 14, wherein the electronic reading device includes a writing means.

19. The system of claim 18, wherein the formatted surface comprises a laminated paper such that the writing means does not leave markings on the laminated paper.

20. The system of claim 18, wherein the writing means can be selectively disabled such that the writing means does not leave markings on the formatted surface.

21. The system of claim 14, wherein the electronic reading device vibrates in connection with an entry of the code.

22. The system of claim 21, wherein the electronic reading device vibrates a first number of times to request that the code be entered and a second number of times to indicate that the code has been correctly entered.

23. The system of claim 20, wherein the electronic reading device remains in an enabled state for a predetermined amount of time.

24. A method of enabling an electronic reading device, comprising the steps of:
   determining a plurality of positions of an electronic reading device relative to an address pattern by detecting portions of the address pattern adjacent to the electronic reading device;
   identifying a unique position on the address pattern from an examination of a portion of the address pattern;
   converting the plurality of positions into an entered code;
   comparing the entered code with a preselected code; and
   enabling at least one function of the electronic reading device if the entered code corresponds to the preselected code.

25. The method of claim 24, wherein the plurality of positions correspond to a plurality of handwritten symbols, the step of converting the plurality of positions into an entered code involving performing a handwriting recognition operation.

26. The method of claim 24, wherein each of the plurality of positions corresponds to a field associated with a specific symbol, the step of converting involving identifying the specific symbol corresponding to each position.

27. The method of claim 24, further comprising the step of initiating a predetermined vibration scheme to request a code entry.

28. The method of claim 24, further comprising the step of initiating a predetermined vibration scheme to indicate that the electronic reading device is enabled.

29. The method of claim 24, wherein the plurality of positions correspond to a plurality of handwritten symbols, each handwritten symbol written in one stroke.

30. The method of claim 24, wherein the electronic reading device includes a writing tip, the address pattern included on a laminated surface such that the writing tip does not leave marks on the surface.

31. The method of claim 24, wherein the electronic reading device includes a writing tip, further comprising the step of disabling the writing tip such that the electronic reading device does not leave marks in connection with a code entry.

32. A method of enabling an electronic reading device, comprising the steps of:
   determining a plurality of positions of an electronic reading device relative to an address pattern by detecting portions of the address pattern adjacent to the electronic reading device;
   converting the plurality of positions into an entered code;
   comparing the entered code with a preselected code;
   enabling at least one function of the electronic reading device if the entered code corresponds to the preselected code; and
   disabling the at least one function of the electronic reading device after a preselected amount of time.

* * * * *